(12) United States Patent
Nagata

(10) Patent No.: US 7,499,730 B2
(45) Date of Patent: Mar. 3, 2009

(54) MOBILE TERMINAL APPARATUS, AND POWER CONTROL METHOD AND STORAGE MEDIUM RECORDING PROGRAM THEREFOR

(75) Inventor: Hideaki Nagata, Tokyo (JP)

(73) Assignee: NEC Corporation, Tokyo (JP)

(*) Notice: Subject to any disclaimer, the term of this patent is extended or adjusted under 35 U.S.C. 154(b) by 1134 days.

(21) Appl. No.: 10/391,213

(22) Filed: Mar. 18, 2003

(65) Prior Publication Data

US 2004/0204140 A1 Oct. 14, 2004

(30) Foreign Application Priority Data

Mar. 28, 2002 (JP) .............................. 2002/092933

(51) Int. Cl.
 *H04B 1/38* (2006.01)
 *G06F 3/033* (2006.01)
 *G06F 3/041* (2006.01)
(52) U.S. Cl. ................... 455/566; 345/156; 345/179; 455/556.1; 455/556.2; 455/574
(58) Field of Classification Search ............. 455/556.1, 455/556.2, 566, 572, 573, 574, 156, 179, 455/182, 183
See application file for complete search history.

(56) References Cited

U.S. PATENT DOCUMENTS

| | | | | |
|---|---|---|---|---|
| 5,933,783 A | * | 8/1999 | Kawakami et al. | 455/566 |
| 6,233,464 B1 | * | 5/2001 | Chmaytelli | 455/556.2 |
| 6,681,333 B1 | * | 1/2004 | Cho | 713/300 |
| 7,149,543 B2 | * | 12/2006 | Kumar | 455/556.2 |

FOREIGN PATENT DOCUMENTS

| | | |
|---|---|---|
| JP | 02-178817 | 7/1990 |
| JP | 8-305496 | 11/1996 |
| JP | H08-331270 | 12/1996 |
| JP | 11-341114 | 12/1999 |
| JP | 2000-181822 | 6/2000 |
| JP | 2001-14100 | 1/2001 |
| JP | 2001-255986 | 9/2001 |

OTHER PUBLICATIONS

Chinese Office Action dated Jun. 4, 2004 with English language translation.

* cited by examiner

*Primary Examiner*—Harry S Hong
(74) *Attorney, Agent, or Firm*—Scully, Scott, Murphy & Presser, P.C.

(57) ABSTRACT

A pen-input unit and a display unit of a mobile terminal apparatus are individually provided so that the display unit can be used only for display, thereby effectively reducing the power consumption of the pen-input unit. The operation panel of the mobile terminal apparatus includes a display unit for displaying a standby screen, a screen displaying the status of call-outgoing/incoming or telephone conversation, a mail-transmission/reception screen, etc. and a pen-input unit having an input panel into which hand-written pen-input is performed and a liquid crystal display unit for displaying a guide display, etc. for input in the input panel. A control unit and ROM start powering the pen-input unit when the display unit enters a display status requesting to perform inputting operation by the pen-input unit, and stop powering the pen-input unit when the display unit enters a display status not requesting to perform an inputting operation by the pen-input unit.

8 Claims, 7 Drawing Sheets

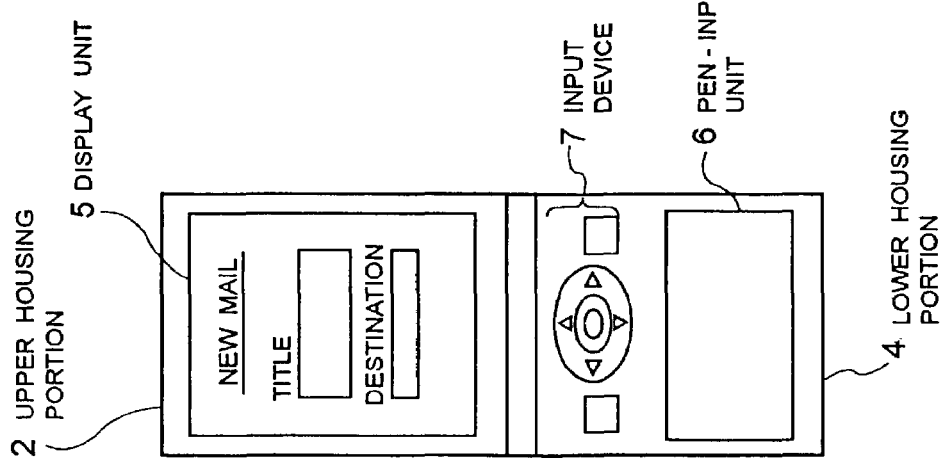
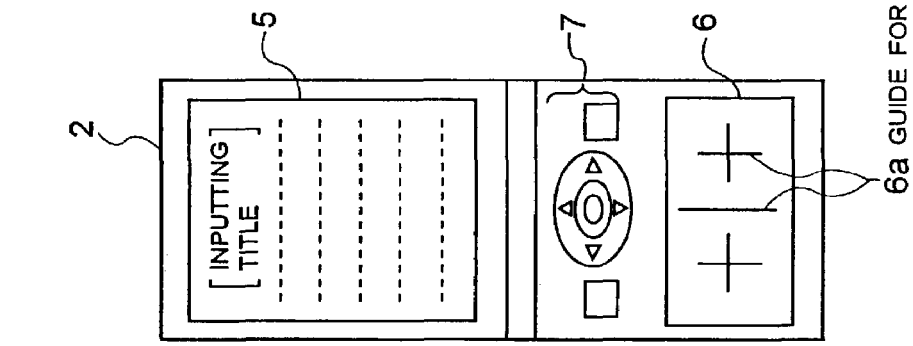
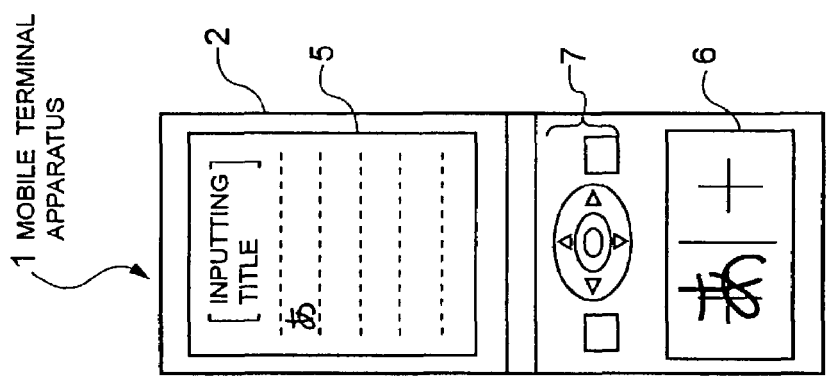

MOBILE TERMINAL APPARATUS, AND POWER CONTROL METHOD AND STORAGE MEDIUM RECORDING PROGRAM THEREFOR

BACKGROUND OF THE INVENTION

1. Field of the Invention

The present invention relates to a mobile terminal apparatus, a power control method for the apparatus, and a storage medium storing a program for the method, and more specifically to a mobile terminal apparatus, and a power control method for the apparatus, and a storage medium storing a program for the method which have a display unit and a pen-input unit capable of inputting handwriting, and can input a character without assigning an input space to a liquid crystal display unit and reduce power consumption by the pen-input unit.

2. Description of the Prior Art

Since a mobile terminal apparatus such as a mobile phone, etc. is requested to be smaller and lighter, the keys for inputting characters, etc. cannot be provided on the surface of its body, etc., and therefore the ten-key for use in inputting a phone number is used also in inputting hirakana (the cursive from of kana) and alphabetic characters. Therefore, when character input is performed, it is necessary to repeatedly operate the ten-key on one character, thereby causing trouble of performing character input. Inputting a phone number is no serious trouble because character input is performed at operation starting, adding some phone numbers, or changing some phone numbers, etc. However, in sending mail which has popularly been performed these days, the trouble is serious. Accordingly, suggested is a mobile terminal apparatus having a display unit with an input panel capable of inputting a handwritten character, a reply character, and other items by providing a touch sensor for the liquid crystal display unit (LCD), and pressing a specified portion by a finger or an input pen.

FIG. 9 shows the conventional mobile terminal apparatus provided with an input panel. In this example, a foldable mobile phone is used as a mobile terminal apparatus. A mobile phone 30 is formed as a foldable unit by an upper housing portion 31 and a lower housing portion 32 coupled by a hinge unit 33. The upper housing portion 31 contains a display unit 34 with an input panel having a liquid crystal display unit. The lower housing portion 32 is provided with a ten-key 35 and a menu key 36. The display unit 34 with an input panel has a screen on which an input panel of a transparent film is applied, and functions as a display device and input device.

In FIG. 9, by pressing using a pen an image of an icon, software, a keyboard, etc. displayed on the screen of the display unit 34, corresponding characters and numerics can be input as data in character input processing. Thus, with the configuration of providing the display unit 34 with an input panel, a mixture of hirakana, katakana (square form of kana), alphabetic characters, numerics, etc. can be input, kanji (Chinese character) can be directly input, and the inputting operation is easily performed when handwritten characters are input.

However, with the configuration shown in FIG. 9, it is necessary to reserve a pen-input area on a part of the screen of the display unit 34 when a handwritten character is input, and there is the problem that the remaining display area is reduced. To solve the problem, for example, Japanese Patent Application Laid-open No. Heisei 11-341114 has been developed as a straight type mobile phone provided with a flip containing a tablet inside the flip as an inputting operation unit, thereby allowing the liquid crystal display means to be used only for display.

With the configuration including an input panel as shown in FIG. 9 or an additional tablet of Japanese Patent Application Laid-open No. Heisei 11-341114, power is supplied to the input panel and the tablet although they are not in use. Therefore, the power consumption is not to be ignored, and the continuous service hour is shortened. To solve the above mentioned problems, for example, Japanese Patent Application Laid-open No. Heisei 2-178817 has been developed to apply pressure to a touch panel using a finger, etc., supply power to the touch panel when an inputting operation is detected, and prevent supply of power to the touch panel when no inputting operation is detected (not in use), thereby reducing the power consumption of the touch panel.

However, according to the conventional mobile terminal apparatus, for example, the mobile phone of Japanese Patent Application Laid-open No. Heisei 11-341114 uses a tablet which excels in the operability as a function key, but cannot input a handwritten character. The mobile terminal apparatus of Japanese Patent Application Laid-open No. Heisei 2-178817 detects an unintentional touch of a touch panel by an operator as a touch status although the operator has no intention of using the touch panel, thereby powering the touch panel unwillingly. Thus, there have been a number of problems in reducing the power consumption, and no perfect means for reducing power consumption have been developed.

BRIEF SUMMARY OF THE INVENTION

The present invention has been developed to solve the above mentioned problems, and aims at providing a mobile terminal apparatus, a power control method, and a program capable of reserving a pen-input unit separate from a display unit for use of display only, supplying power to the pen-input unit only when it requires power, thereby effectively reducing the power consumption by the pen-input unit.

To attain the above mentioned purposes, the present invention provides a mobile terminal apparatus including: a housing; a display unit, provided on the surface of the housing, for displaying a control status, an operating status, or an execution status of a selected function; a pen-input unit which inputs handwriting, and is provided on a surface which is in the same plane when the pen-input unit is operated as the surface on which the display unit is provided; and control means for powering the pen-input unit when the display unit enters a display status of requesting an inputting operation by the pen-input unit, and powering off the pen-input unit when the display unit enters a display status not requiring an inputting operation by the pen-input unit.

The present invention also provides a power control method for a mobile terminal apparatus having a pen-input unit, comprising: a power control request detecting step of detecting a request as to whether or not the pen-input unit is to be powered, calling a power ON specifying unit when the pen-input unit is to be powered, and calling a power OFF specifying unit when the pen-input unit is not to be powered; a power ON specifying step of a power control executing unit generating necessary information for powering the pen-input unit, and the power control executing unit being called according to the information; a power OFF specifying step of the power control executing unit generating necessary information for powering down the pen-input unit, and the power control executing unit being called according to the information; and a power control executing step of powering or powering down the pen-input unit.

The present invention also provides a storage medium storing a program used to direct a computer to perform a power control method for a mobile terminal apparatus having a pen-input unit, comprising: a power control request detecting step of detecting a request as to whether or not the pen-input unit is to be powered, calling a power ON specifying unit when the pen-input unit is to be powered, and calling a power OFF specifying unit when the pen-input unit is not to be powered; a power ON specifying step of a power control executing unit generating necessary information for powering the pen-input unit, and the power control executing unit being called according to the information; a power OFF specifying step of the power control executing unit generating necessary information for powering down the pen-input unit, and the power control executing unit being called according to the information; and a power control executing step of powering or powering down the pen-input unit.

With the configuration, the display unit is used for display only, and the pen-input unit is used in an inputting operation for pen-input (inputting handwriting) and displaying the input handwriting. Therefore, a part of the display area of the display unit is not assigned to handwriting input, and the pen-input unit is powered only when a request for the pen-input is displayed, thereby effectively reducing the power consumption for the pen-input unit although the pen-input unit for inputting a handwritten character is provided separate from the display unit.

BRIEF DESCRIPTION OF THE DRAWINGS

FIGS. 5A to 5C show the changes of the status of the pen-input unit depending on the power supply, and the display contents of the display unit; that is, FIG. 5A shows the status when the pen-input unit is not powered; FIG. 5B shows the status when the pen-input unit is powered; and FIG. 5C shows the status when a handwritten character is input through the pen-input unit;

FIG. 6A shows the status when the pen-input unit is not powered; and FIG. 6B shows the status when the pen-input unit is powered;

DETAILED DESCRIPTION OF THE PREFERRED EMBODIMENTS

The embodiments of the present invention are described below by referring to the attached drawings.

Figure 1:
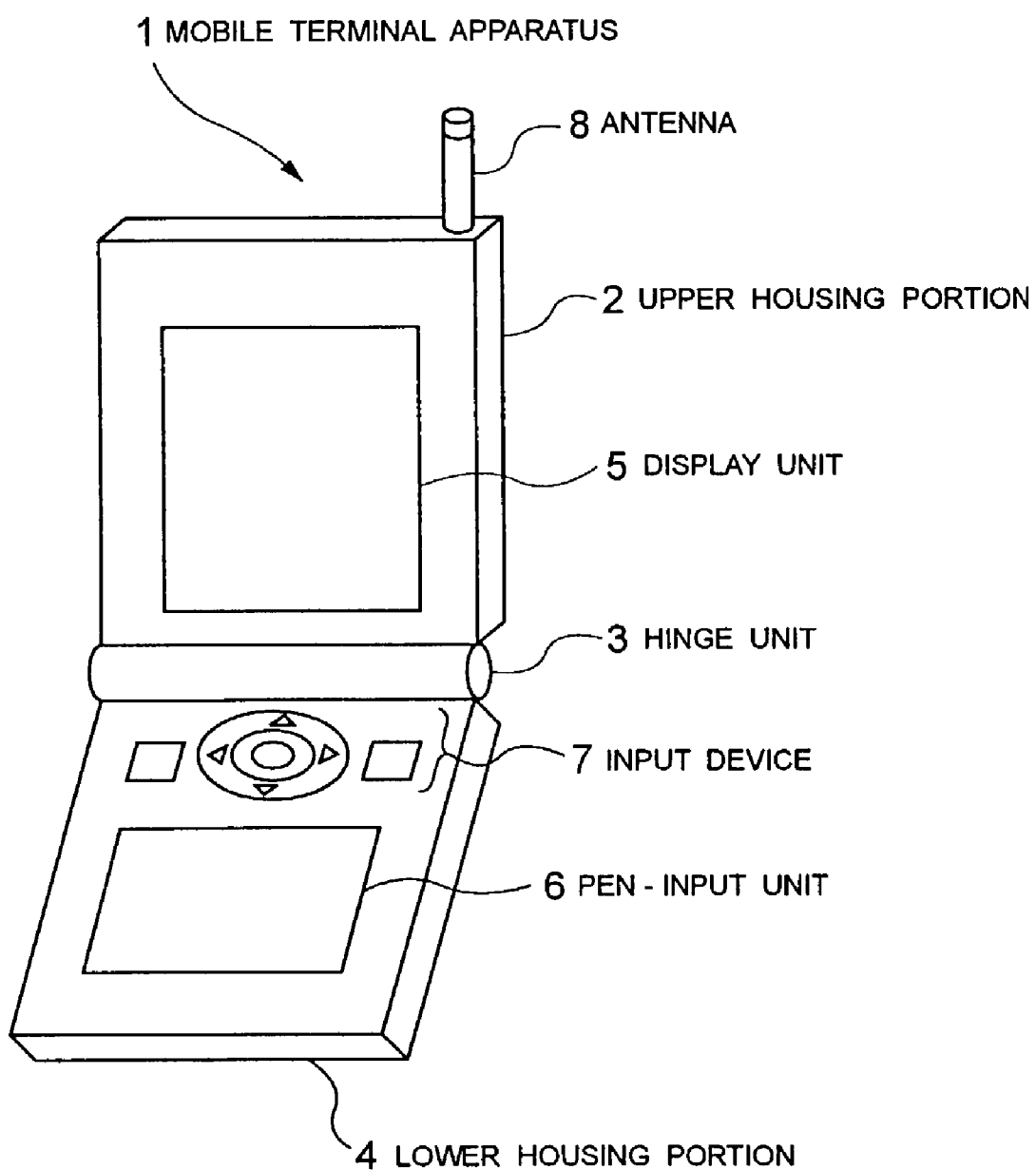
FIG. 1 is an oblique view showing the first embodiment of the mobile terminal apparatus according to the present invention.

FIG. 1 shows the first embodiment of the mobile terminal apparatus according to the present invention. As described below, a mobile phone is used as a mobile terminal apparatus.

A mobile terminal apparatus 1 (mobile phone) is formed by an upper housing portion 2 and a lower housing portion 4 coupled as a foldable structure by a hinge unit 3. When the mobile terminal apparatus 1 is folded, it is halved with the two portions overlaid each other, and the mobile terminal apparatus 1 enters the expansion state, the upper housing portion 2 is horizontally coupled to the lower housing portion 4. A display unit 5 is provided by a liquid crystal display unit inside the upper housing portion 2, and the lower housing portion 4 contains a pen-input unit 6 for inputting handwritten numerics, characters, etc., and an input device 7 for inputting other items. Additionally, an expandable antenna 8 is provided for the upper housing portion 2.

The display unit 5 is used for display only, and displays a guide, etc. for pen-input. For example, a standby screen, a screen displaying the status of call-outgoing/incoming or telephone conversation in voice communications, a mail-transmission/reception screen, etc. are displayed. The pen-input unit 6 comprises an input panel (not shown in the attached drawings) for pen-input, and a liquid crystal display unit (liquid crystal display means, but not shown in the attached drawings) for displaying a guide, etc. for input into the input panel, and a handwritten character, and numerics by software and a keyboard are input, operations of inputting a handwritten character are performed, and a guide display, a display for software and a keyboard, etc. are performed. The input device 7 is configured using a device such as a key, a pointing device, etc., and has the functions of a power-on key, voice transmission start key, a call incoming key, a direction key, a pointing device, etc. of the mobile phone 1. It is not necessary for the input devices 7 to be centrally provided on the lower housing portion 4 as shown in FIG. 1, but can be distributed into convenient positions.

Figure 2:
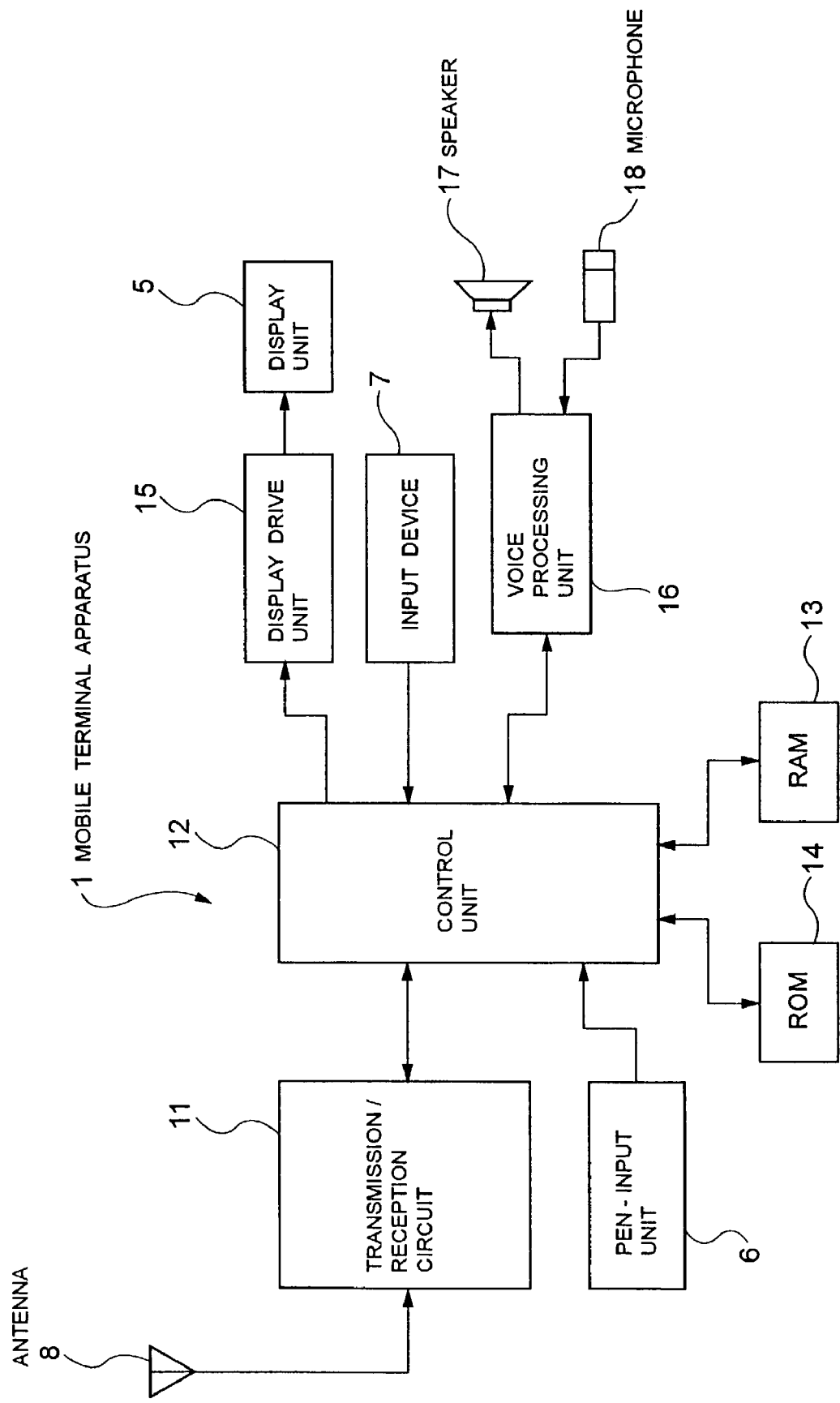
FIG. 2 is a block diagram of the configuration of the electric system of the mobile terminal apparatus shown in FIG. 1.

FIG. 2 shows the configuration of the electric system of the mobile terminal apparatus 1.

The mobile terminal apparatus 1 comprises the display unit 5, the pen-input unit 6, the input device 7, the antenna 8, a transmission/reception circuit 11, a control unit 12, RAM 13, ROM 14, a display drive unit 15, a voice processing unit 16, a speaker 17 as a receiver, and a microphone 18 as a transmitter.

The transmission/reception circuit 11 is connected to the antenna 8. The transmission/reception circuit 11 is controlled by the control unit 12, comprises a reception circuit, a transmission circuit, a modulation circuit, and a demodulation circuit, and performs transmitting/receiving operations of voice, mail, etc. To the control unit 12, the pen-input unit 6, the input device 7, the RAM 13, the ROM 14 which is non-volatile memory, the display drive unit 15, and the voice processing unit 16 are connected. The control unit 12 comprises a CPU, and controls the entire mobile terminal apparatus according to the program written to the ROM 14. The RAM 13 can be, for example, flash memory, and stores phone book data and other data. The voice processing unit 16 converts an analog audio signal from the microphone 18 into digital data (audio data), converts the audio data demodulated by the control unit 12 into an analog audio signal, amplifies the signal, and drives (electro-audio converts) the speaker 17.

Figure 3:
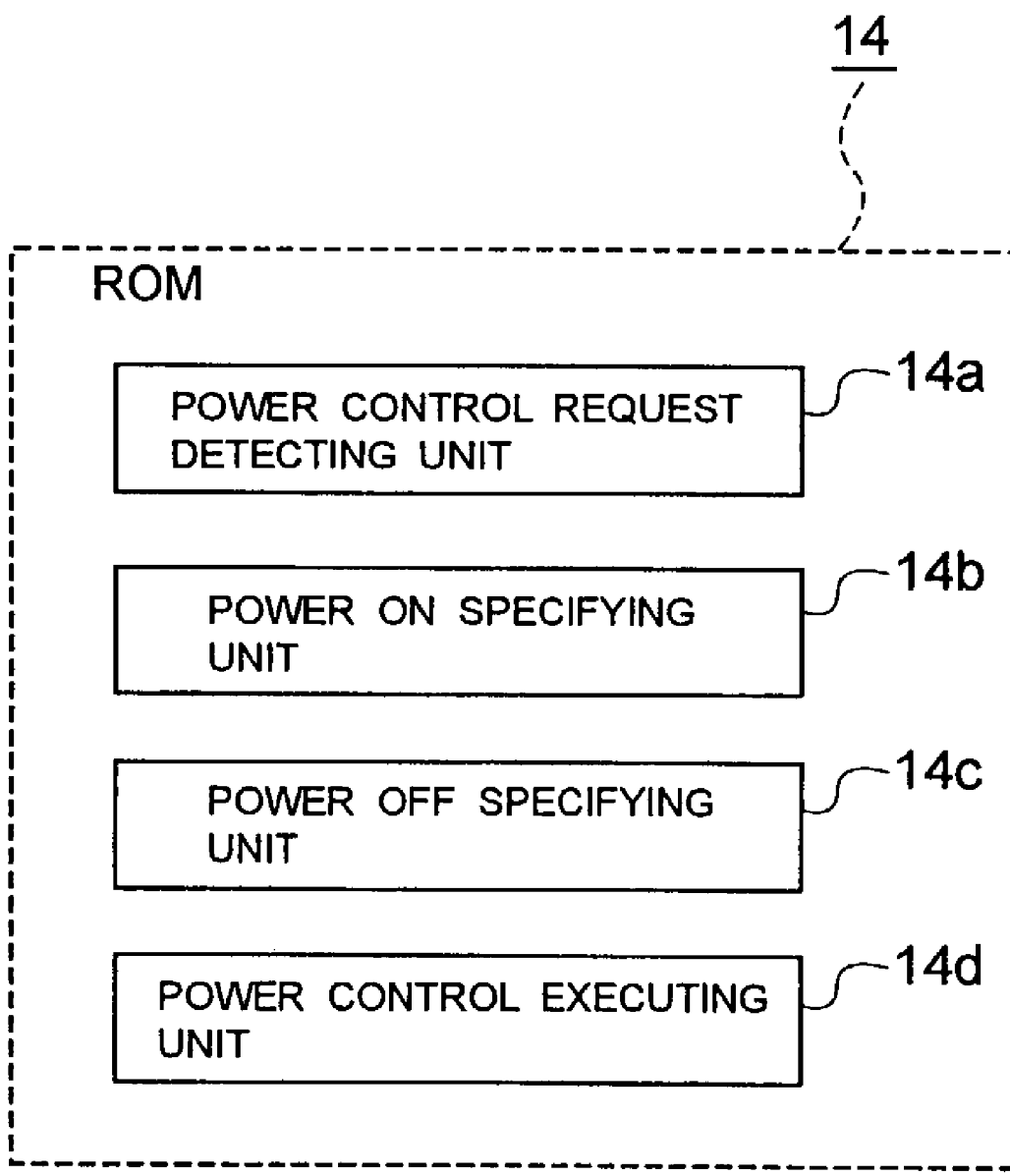
FIG. 3 shows the configuration of the program stored in the ROM shown in FIG. 2.

FIG. 3 shows the configuration of the program stored in the ROM 14. The ROM 14 comprises a power control request detecting unit 14a, a power ON specifying unit 14b, a power OFF specifying unit 14c, and a power control executing unit 14d. The power control request detecting unit 14a detects a request to power or not to power the pen-input unit 6. If it is to be powered, the power control request detecting unit 14a calls the power ON specifying unit 14b. If it is not to be powered, the power control request detecting unit 14a calls the power OFF specifying unit 14c. The power ON specifying unit 14b generates necessary information for the power control executing unit 14d to power the pen-input unit 6, based on which the power control executing unit 14d is called. The power OFF specifying unit 14c generates necessary information for the power control executing unit 14d to power down the pen-input unit 6, based on which the power control executing unit 14d is called. The power control executing unit 14d performs the process of powering or powering down the pen-input unit 6.

Figure 4:
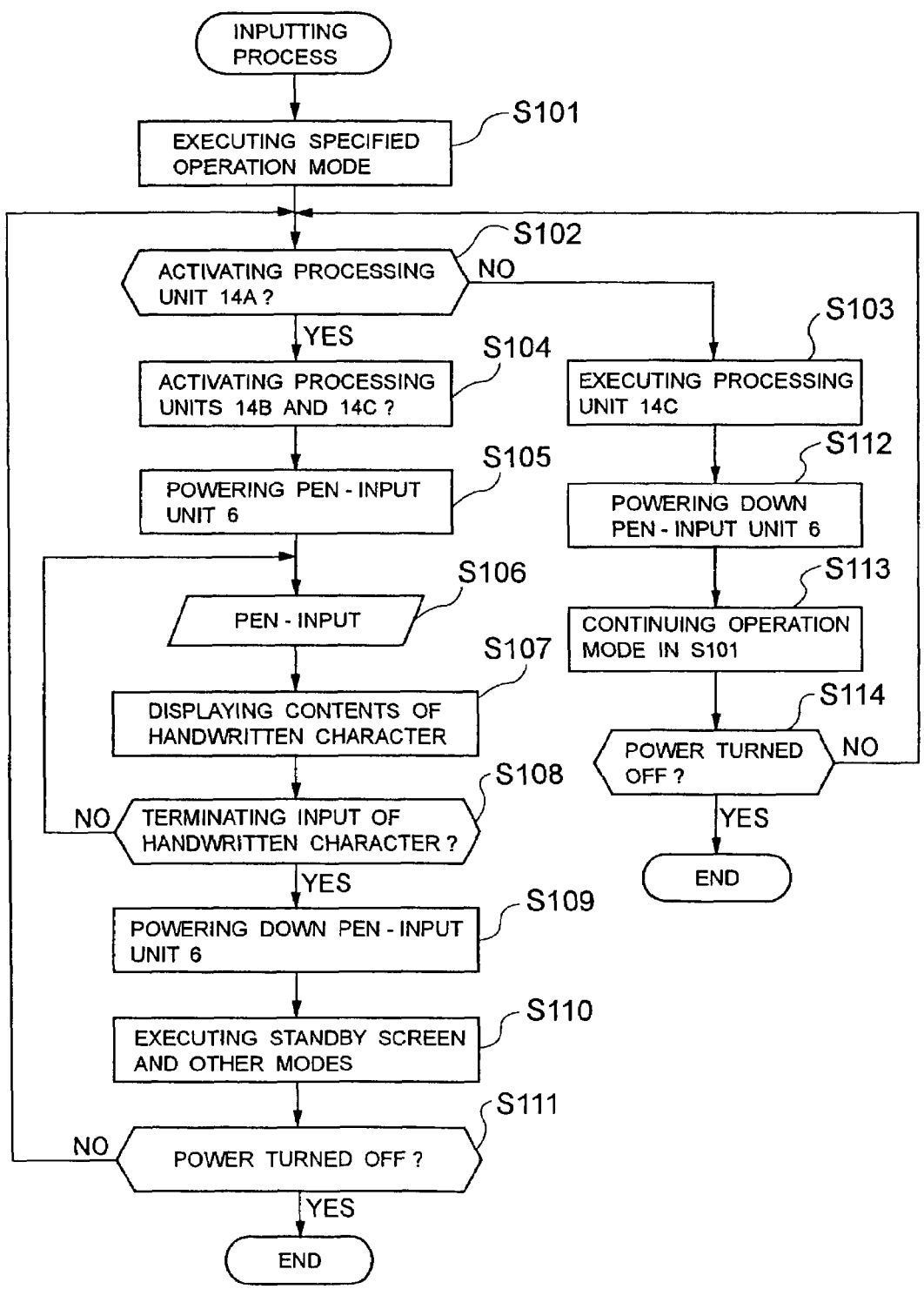
FIG. 4 is a flowchart of the inputting process of the mobile terminal apparatus according to the present invention.
Figure 6A:
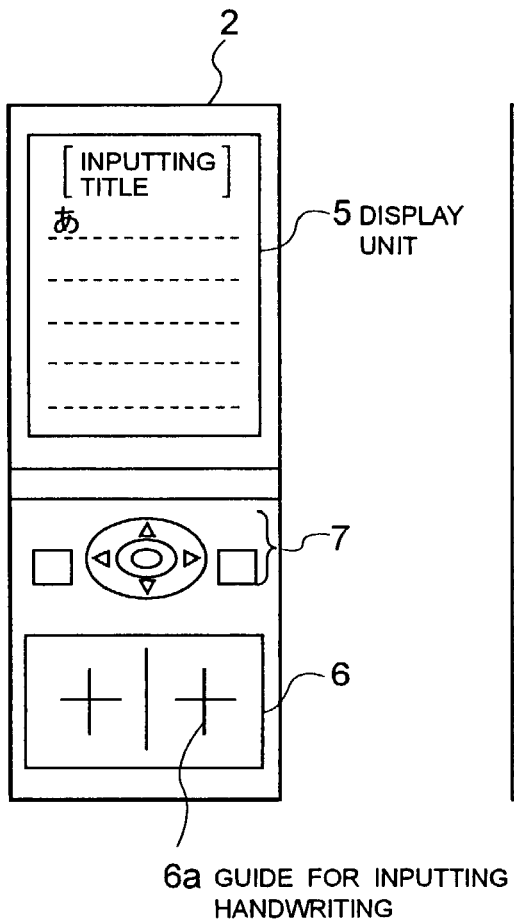
FIGS. 6A and 6B show the changes of the status of the pen-input unit and the display contents when the pen-input unit is not powered; that is.
Figure 6B:
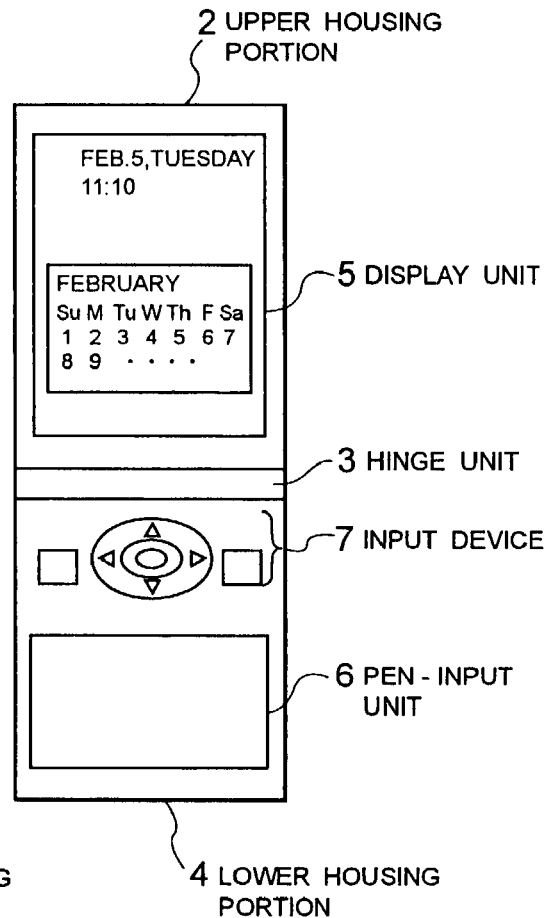
Figure 7:
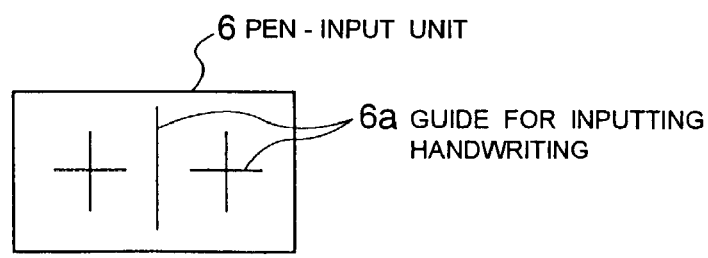
FIG. 7 is a plan view of a guide for handwriting input displayed on the display screen of the pen-input unit when the pen-input unit is powered.

FIG. 4 shows an inputting process of the mobile terminal apparatus shown in FIG. 1. FIGS. 5A to 5C show the changes of the status of the pen-input unit 6 and the display contents of the display unit 5 when the pen-input unit 6 is powered. FIGS. 6A and 6B show the changes of the status of the pen-input unit 6 and the display contents of the display unit 5 when the pen-input unit 6 is powered down. Each process is performed by the control unit 12 according to the program shown in FIG. 3. FIG. 7 shows a guide 6a for inputting handwriting displayed on the display screen of the pen-input unit 6 when the pen-input unit 6 is powered. "S" shown in FIG. 4 indicates a step.

Assume that the display contents of the display unit 5 indicate the status (new mail generation screen) shown in FIG. 5A on condition that the mobile terminal apparatus 1 is powered, the pen-input unit 6 is not being used, and the operation mode specified by a user is being executed (S101). On this screen, user input is requested into the columns of the "input of title" and "destination". Then, the control unit 12 generates a request to input a handwritten character. When the power control request detecting unit 14a detects the request (S102), the power ON specifying unit 14b is called (S104), and the pen-input unit 6 is powered (S105). On the other hand, if there is no request to input a handwritten character, then the power OFF specifying unit 14c is activated (S103). When the pen-input unit 6 is powered (S105), the guide 6a shown in FIG. 7 is displayed on the display screen of the pen-input unit 6, and the pen-input unit 6 can perform the pen-input (inputting a handwritten character) (S106). At this time, the display unit 5 changes from the display contents (mail management) shown in FIG. 5A to the display contents (inputting a mail title before an inputting operation) shown in FIG. 5B. If the pen-input unit 6 is operated, and, for example, a hand-written kana character of "a" is input, then the liquid crystal display unit of the pen-input unit 6 displays the locus of the character (S107), and the kana character of "a" is displayed as shown in FIG. 5C in the lower part of the column of the "input of title" of the display unit 5 as a converted character corresponding to the character input by the pen-input unit 6. The kana character of "a" is confirmed as is, or converted as necessary into a kanji character based on the combination with the next input character. When the characters of the "input of title" are completely input, the display unit 5 enters the screen (not shown in the attached drawings) for input of the "destination", thereby inputting characters by the pen-input unit 6.

When the characters have been completely input by the pen-input unit 6 (S108), the user performs the operation of entering the standby screen. At the point of entering the standby screen, it is not necessary to input handwritten characters. Therefore, a request to terminate inputting handwritten characters is issued. The request is determined by the power control request detecting unit 14a, the power OFF specifying unit 14c is called, and the power control executing unit 14d powers down the pen-input unit 6 (S109). Simultaneously, the display on the display unit 5 changes from the contents shown in FIG. 6A to the contents (standby mode) shown in FIG. 6B (S110), and the screen of the standby mode is displayed. Then, it is determined whether or not the power is turned off (by pressing an exclusive button or a specified button in the input device 7) (S111). If yes, all process terminates. If not, control is returned to step S102, and the subsequent processes are repeatedly performed.

If the power OFF specifying unit 14c performs its operation in S103, then the pen-input unit 6 is powered down (S112), and the process in S101 continues (S113). Then, it is determined whether or not the power is turned off (S114). If yes, all process terminates. If not, control is returned to step S102, and the subsequent processes are repeatedly performed.

As described above, the pen-input unit 6 and the display unit 5 are provided for each of the upper housing portion 2 and the lower housing portion 4. Therefore, the area of the display screen of the display unit 5 of the upper housing portion 2 is not occupied by a pen-input area although handwriting is input, the pen-input unit 6 is automatically powered or powered down depending on the switch of the screen, and power control can be more appropriately performed than the power control by the conventional timer or manual operations, thereby effectively reducing the power consumption.

Figure 8:
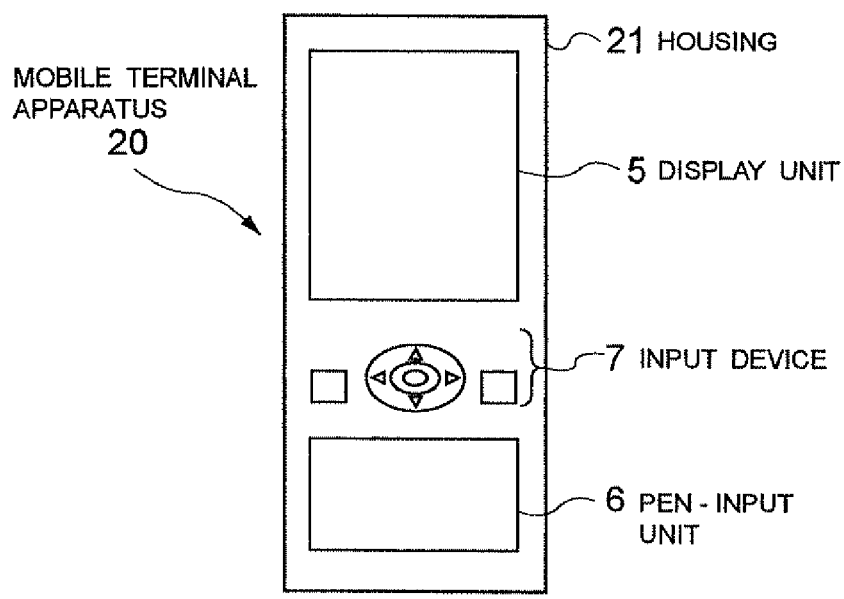
FIG. 8 is a plan view of the second embodiment of the present invention.
Figure 9:
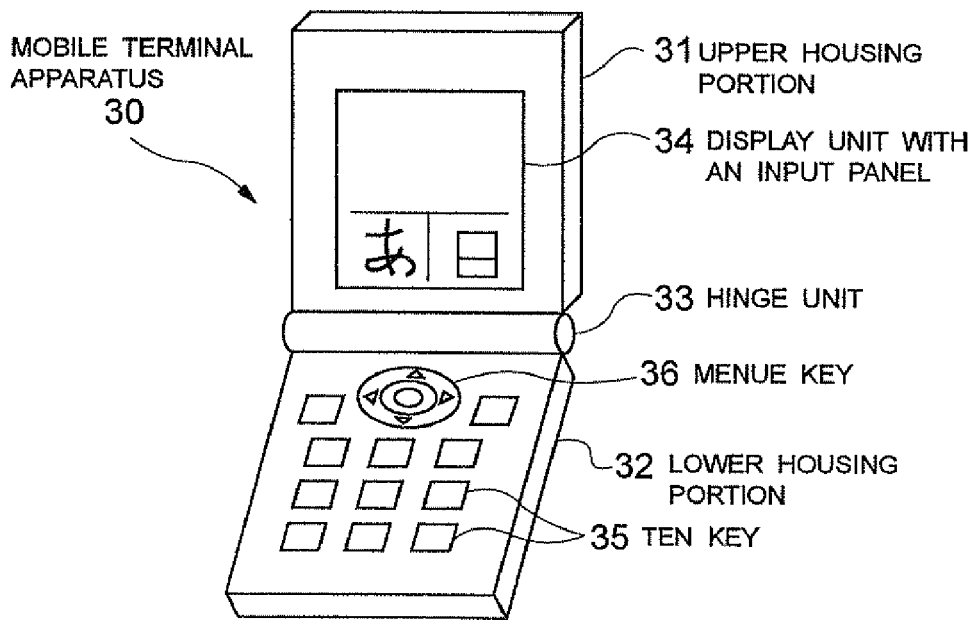
FIG. 9 is an oblique view of the conventional mobile terminal apparatus provided with an input panel.

FIG. 8 shows the second embodiment of the present invention. A mobile terminal apparatus 20 according to the present embodiment is a straight type (non-foldable type) formed by a single housing 21, and the display unit 5, the pen-input unit 6, and the input device 7 are provided on its surface. The configurations and the shapes (or specifications, etc.) of the display unit 5, the pen-input unit 6, and the input device 7 are the same as those according to the first embodiment, and the power controlling operations of the pen-input unit 6 are the same in both embodiments. Therefore, the same effects can be obtained.

In each of the above mentioned embodiments, a mobile phone is used as a mobile terminal apparatus. However, the present invention can also be applied to a PHS (personal handyphone system) unit, a PDA (personal digital assistant) device, etc.

As it is clear as described above, according to the mobile terminal apparatus, the power control method, and the storage medium storing the program therefor, a display unit used only for display and a pen-input unit having the function of performing an inputting operation for pen-input (inputting handwriting) and the function of displaying handwriting are provided, a part of the display area of the display unit is not assigned for inputting handwriting, and the pen-input unit is powered only when a request to perform pen-input is displayed, thereby using the display unit only for display, and effectively reducing the power consumption of the pen-input unit.

What is claimed is:

1. A mobile terminal apparatus, comprising:

a housing;

a display unit, provided on a surface of said housing, for displaying a control status, an operating status, or an execution status of a selected function;

a pen-input unit which inputs handwriting, and is provided on a surface which is in the same plane when said pen-input unit is operated as the surface on which said display unit is provided; and control means for powering said pen-input unit when said display unit enters a display status of requesting an inputting operation by said pen-input unit, and powering off said pen-input unit when said display unit enters a display status not requiring an inputting operation by said pen-input unit.

2. The mobile terminal apparatus according to claim 1, wherein said housing comprises an upper housing portion positioned upward in use, and a lower housing portion coupled to said upper housing portion in a foldable structure by a hinge unit; said display unit is mounted on said upper housing portion; and said pen-input unit is mounted on said lower housing portion.

3. The mobile terminal apparatus according to claim 1, wherein said housing is one housing unit, and said display unit and said pen-input unit are in the same plane.

4. The mobile terminal apparatus according to claim 1, wherein said pen-input unit comprises an input panel on which pen-input is performed, and liquid crystal display means which is provided in said input panel and on which a guide display for input and input contents are displayed.

5. The mobile terminal apparatus according to claim 1, wherein said pen-input unit has an operation panel on which a guide for inputting handwriting is displayed when powered.

6. The mobile terminal apparatus according to claim 5, wherein said pen-input unit includes one or more cross marks in the guide for inputting handwriting.

7. The mobile terminal apparatus according to claim 5, wherein said pen-input unit includes two cross marks and one line mark between the cross marks as a guide for inputting handwriting.

8. The mobile terminal apparatus according to claim 1, wherein said mobile terminal apparatus is a mobile phone.

* * * * *